Dec. 28, 1943.   E. COOK   2,337,801
OFFSET DISK HARROW
Filed Nov. 3, 1941   3 Sheets-Sheet 1

Inventor
EINAR COOK
By Francis C Huebner
Attorney

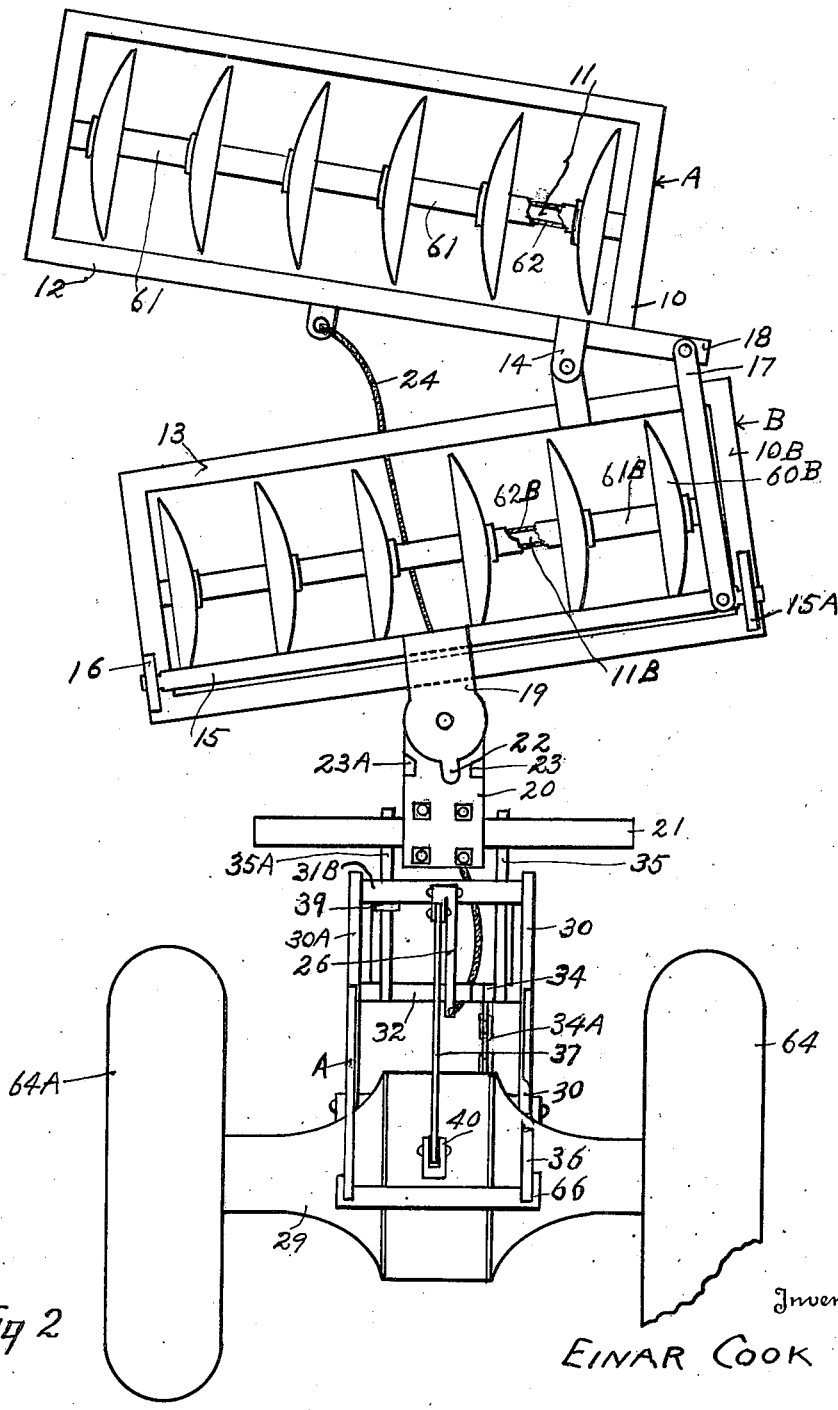

Dec. 28, 1943.  E. COOK  2,337,801

OFFSET DISK HARROW

Filed Nov. 3, 1941  3 Sheets-Sheet 3

EINAR COOK Inventor

By Francis C. Huebner
Attorney

Patented Dec. 28, 1943

2,337,801

UNITED STATES PATENT OFFICE 2,337,801

OFFSET DISK HARROW

Einar Cook, Clovis, Calif.

Application November 3, 1941, Serial No. 417,669

5 Claims. (Cl. 55—83)

My invention relates to an offset disk harrow, and more specifically to the hitch connecting the harrow with the tractor.

The object I have accomplished is a hitch which will automatically draw the front and rear sections in parallel relation, that will automatically raise the front section out of the earth in turning the tractor, that will regulate the depth of the cut of the disk blades automatically, that will not side swipe when moving over irregular ground, but the two sections will automatically and instantly cooperate to equalize the side drafts on the two sections, so that the side draft on one section will constantly counterbalance the side draft on the other section, and the harrow will follow truly in the direction of the pull by the tractor, and other objects which will be hereinafter disclosed.

These objects are accomplished by the device hereinafter described, and illustrated on the accompanying drawings, in which Fig. 1 shows a top view of the harrow attached to a fractional tractor with the two sections of the harrow shown in parallel relation.

Fig. 2 shows a top view of the harrow and hitch as shown in Fig. 1 except the harrow is shown with the sections in angular relation.

Figure 1:
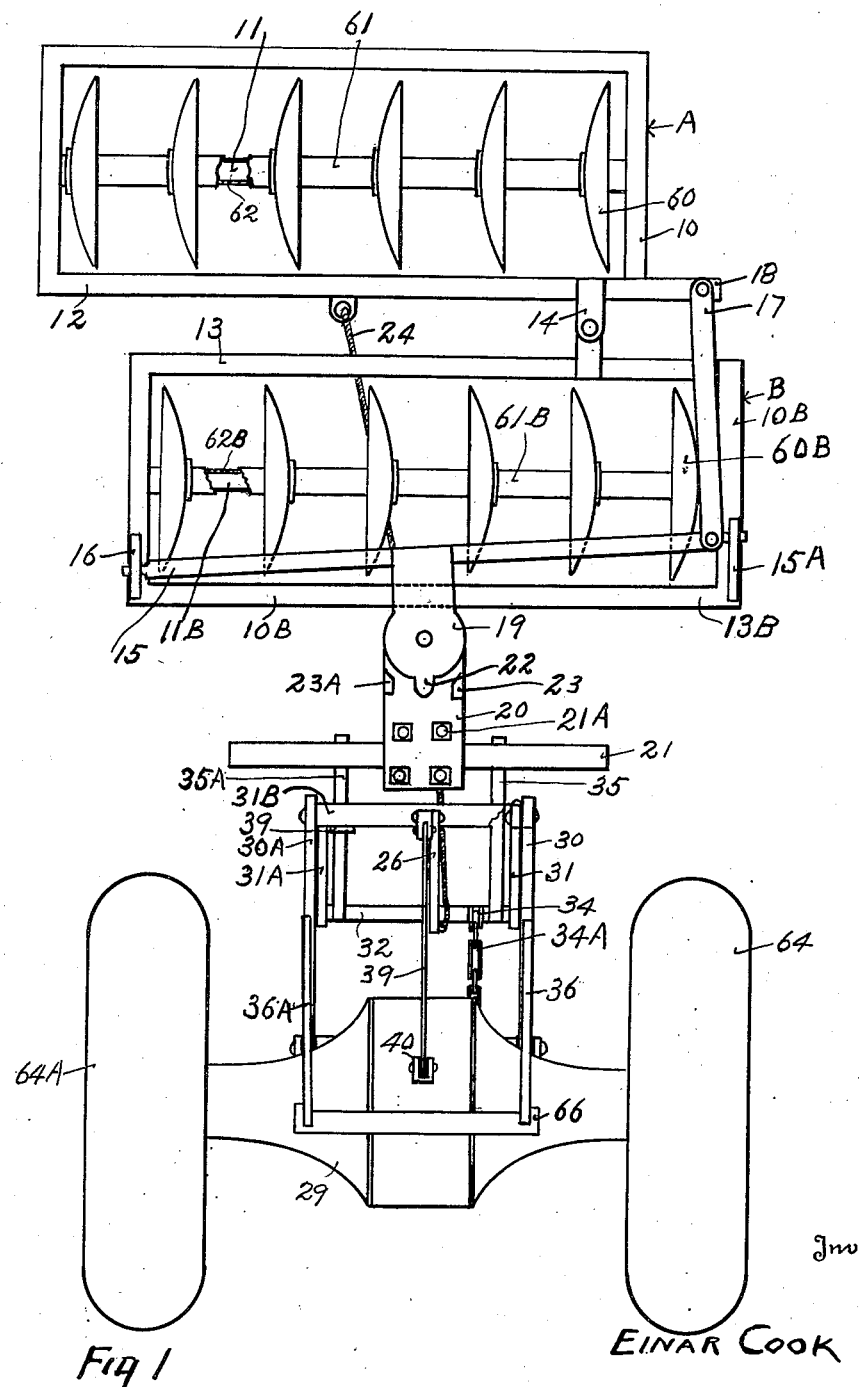

Referring to the drawings, the rear section of the harrow is indicated as A, and the front section as B. Rear section A consists of rectangular frame 10, axle 11, which axle is attached laterally to frame 10, and a plurality of disk blades 60, and spools, or spacers 61, alternately assembled on tube 62 as shown in the drawings, and tightly clamped thereon. Tube 62 is adapted to be rotated on axle 11. Front section B is a duplicate of section A in many respects, having a rectangular frame 10B, an axle 11B, disk blades 60B, spacers or spools 61B, a tube 62B to hold the assembled disk blades and spacers together for rotation on axle 11B. It is here noted that when sections A and B are assembled to make the offset harrow, the concave faces of the disc blades 60 are faced in the reverse direction of the concave faces of disc blades 60B. The object of thus reversing the direction of the concave faces on the two sections will be more fully hereinafter disclosed.

Figure 4:
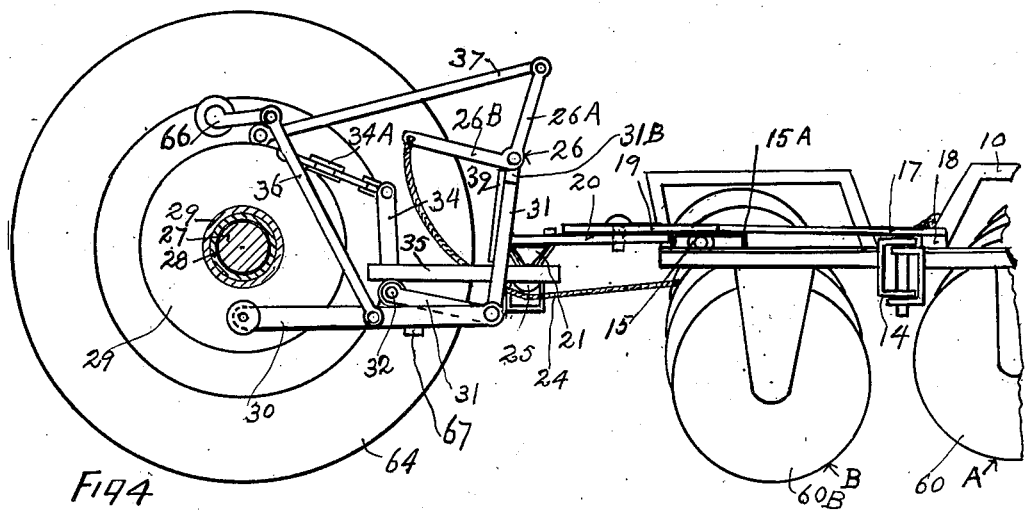
Fig. 4 is a side view similar to that shown in Fig. 3 except that the sections of the harrow are angled and are adjusted for tilling the soil.
Figure 3:
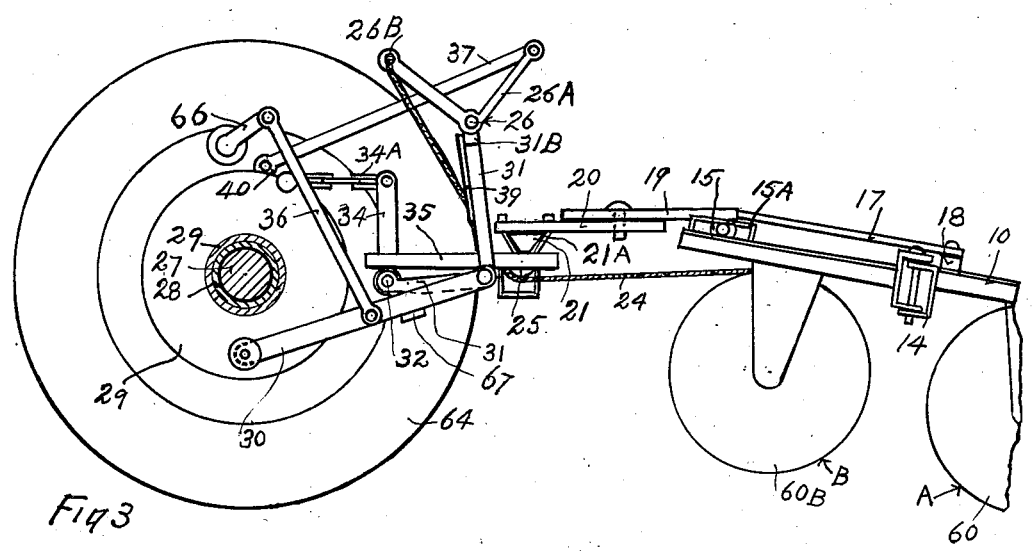
Fig. 3 is a side view of the harrow and portions of the tractor showing the harrow in closed relation, and the front section raised out of the earth to permit turning either to the right or to the left.

Sections A and B are connected with a hinge 14. The pivot of hinge 14 is elongated as shown in Figs. 3 and 4, and is positioned vertically, the purpose being to permit a free movement of sections A and B with regard to each other on a horizontal plane, and to hold said sections A and B approximately rigid as to vertical movements in relation to each other.

Hinge 14 should be positioned on front bar 12 of frame 10 between the lineal center of said bar 12 and an end, and said hinge should be positioned on rear bar 13 of frame 10B at a point slightly nearer the center point of bar 13 than the location of the hinge on bar 12. The object of thus positioning the hinge on the two sections is to have the disc blades on one section roll on a line between the cut of the disc blades on the other section.

On the front bar 13B of frame 10B, and near one end thereof, I have attached angling bar 15 with a universal pivot 16, thus permitting the bar to have a limited universal movement thereon. This pivotal attachment is preferably near the end of bar 13B opposite to the end of frame 10B to which hinge 14 is attached. The free end of angling bar 15 is adapted to slide in a short slideway 15A. The character of the engagement of angling bar 15 with slideway 15A also permits said angling bar to have a slight rocking movement. On front bar 12 on section A, and adjacent to hinge 14, is an arm 18 which extends toward the end of bar 12 nearest the hinge. A link 17 is pivotally attached to, and connects the free ends of arm 18 and angling bar 15.

The hitch consists of a plate 19 which is rigidly attached to angling bar 15 near the lineal center thereof, and a cooperating plate 20, attached to bar 21 by clamps 21A thus permitting the plate 20 to be changed as to location on said bar. Such adjustment of plate 20 on bar 21 is necessary as hereinafter shown, in aligning the path of the harrow toward the right, or toward the left of the path of the tractor as desired. Bar 21 will be more fully hereinafter identified with the draft means. Plates 19 and 20 are pivotally connected with their faces adjacent, thus forming a hinge, or turn table which permits of a horizontal movement of the elements attached to them respectively, and hinders vertical movement of said parts with regard to each other. It is here noted that other forms of hinges may be substituted, the object being to provide a hinge which will permit of horizontal movements only.

It is here noted that draft on the hitch described is communicated to the approximate center of angling bar 15, which angling bar being pivotally connected at one end to section B, will tend by the transmission of said draft through link 17 and arm 18 to pull sections A and B in angular relation with each other as shown in Fig. 2.

The pressure of the earth against the concave faces of the blades when the disk harrow is being operated, tends to angle the respective sections with each other because of the side draft on the disk blades, and the concave faces being reversed on the two sections, the one section has a side draft in one direction while the other section has a side draft in the opposite direction. In ground of uniform fine texture, and without obstruction, said sections would normally go forward in a direct line following the tractor, and the side draft of the two sections would be approximately balanced. In actual practice there are tufts of sod, roots, and other obstructions scattered through the earth at irregular intervals. When the disk blades on one of the sections of the offset harrow hit such obstacle, the side draft of the section hitting the obstacle is greater than the cooperating section, and the side draft is thus unbalanced, the harrow is thrown to the right, or to the left, depending on the section which encountered the obstruction. The result frequently is that such side draft will throw the harrow sufficiently out of its normal path that desirable plants are cut out by the harrow and destroyed. One of the reasons for this unregulated side draft is that the angle of the front section is rigidly fixed by the hitch used at the present time. I have overcome this objection by locating the hitch, or turn table consisting of plates 19 and 20 pivotally attached, very near to the frame 10B of front section B, and the connection between the draft means and said pivoted plates 19 and 20 is rigid, being subject to adjustment only when the harrow is inactive.

Also, in my construction, I prefer to have the distance from the pivotal connection of plates 19 and 20 to axle 11B of section B, approximately equal to the distance from said axle 11B to the pivot of hinge 14. When the offset harrow is thus constructed the pressure of the earth against the disk blades on the two cooperating sections A and B will balance each other. This construction should be used in connection with the turn table 19—20 hereinbefore described.

To limit the angular relation of sections A and B, and especially to prevent front section B from turning so it will not come in contact with the rear wheels of the tractor pulling the harrow, I have constructed a lug 22 on plate 19, and stops 23 and 23A on plate 20, the lug and stops referred to being positioned to engage when the rotation of plate 19 on plate 20 have reached predetermined locations.

The mechanism of the tractor adapted to cooperate with the mechanism on the offset disk harrow hereinbefore described is as follows:

Duplicate lift arms 30 and 30A are pivotally attached to housing 29 of the tractor, on the two opposite sides of said tractor. Duplicate connecting rods 36 and 36A are pivotally connected at one end to lift arms 30 and 30A, and at the other end are pivotally attached to a crank 66, which crank is operated by hydraulic means not shown in the drawings. By this means lift arms are radially moved up and down by the hydraulic power which is controlled by the operator. Connecting rods 36 and 36A can be made adjustable as to length if desired by any well known means.

At the free ends of lift arms 30 and 30A are attached bell cranks 31 and 31A, said bell cranks being pivotally attached adjacent to the angles of the bell cranks. One arm of each of said bell cranks extends at approximately right angles to the lift arms to which they are attached, and the upper ends of said branches is bridged with a beam 31B, as shown in Figs. 1 and 2. The other arms of said bell cranks 31 and 31A extend along lift arms 30 and 30A, and at the end thereof is a female bearing which bearings carry a shaft 32, which can be rocked therein. Shaft 32 has a lever 34 rigidly attached thereto. A link, or chain 34A extends from the free end of lever 34 to housing 29. Chain 34A is adapted to anchor shaft 32 and the elements connected therewith and hereinafter described so as to limit the rocking movement of said shaft. To shaft 32 is also rigidly attached draw bars 35 and 35A, to which bars, near the end opposite to shaft 32, is rigidly attached bar 21, carrying plate 20 as hereinbefore described.

It will be noted that when lift arms 30 and 30A are in an approximately horizontal position, bell cranks 31 and 31A, and the assembly of elements connected therewith, will be lowered, and the front section B of the harrow will be lowered for engagement with the earth, and when lift arms 30 and 30A are raised, the fact that lever 34 is anchored to the housing with link 34A, draw bars 35 and 35A are held in a horizontal position, the front section B of the harrow will be raised therewith. The depth of the cut of the harrow may be regulated by the angle, from a horizontal line, or the lack of said angle, that lift arms 30 and 30A are positioned. I have therefore placed an adjustable stop 39 on beam 31B. This stop engages draw bar 35A on the downward movement of lift arms 30 and 30A, and regulates the depth of the cut of the disk blades.

To draw sections A and B in parallel relation with each other before lifting the harrow, I have constructed a bell crank 26 which is pivotally mounted at its angle on the top of beam 31B. A rigid bar 37 is pivotally connected at one end to anchor 40 on housing 29, and at the other end pivotally connected to arm 26A of the bell crank 26. To the other arm, 26B, of bell crank 26, is attached a cable 24, which extends to, and is connected with section A of the harrow. A roller, or pulley 25 is attached to the under face of bar 21. Cable 24 passes over pulley 25 to reduce friction in the back and forth movement.

It will be noted that when lift arms 30 and 30A are raised from their lower position, which is approximately a horizontal position, the approximate centers of lift arms 30 and 30A bear the weight of raising the harrow, while the free ends of lift arms 30 and 30A move in a longer radius. The closing of sections A and B is accomplished by lifting arms 30 and 30A which raises bell crank 31, and with it beam 31B to which bell crank 26 is pivotally attached, and when thus raised the cable 24 is tightened as shown in Figs. 1 and 3, and the rear section is drawn parallel to the front section.

In order to limit the movement of bell crank 31 with respect to lift arms 30 and 30A, as shown in Figs. 3 and 4, I have attached a stop 67 to bell crank 31 so that it will engage lift arm 30 on the upward movement of the bell crank.

An adjustable stop 39 is attached to beam 31B, so that on the downward movement of said beam the stop will engage draw bar 35A. This stop regulates the depth of the cut of the disc blades.

The axle of the tractor is shown in Figs. 3 and 4 as 27. Axle 27 runs in a bearing 28 which bearing is within axle housing 29.

Having described my invention I claim as new and ask for Letters Patent:

1. A hitch for connecting a tractor to an offset disk harrow, consisting of lift arms pivotally attached to the housing of the tractor, means for raising and lowering said lift arms at will, a bell crank provided for each lift arm, said bell cranks being attached to the lift arms near the free end of the lift arm, and near the angles of the bell cranks, one arm on each of said bell cranks extending approximately adjacent to the lift arm to which it is attached, and the other arm on each of said bell cranks extending upwardly, the upwardly extending arms of said bell cranks being rigidly connected and bridged with a bar, a shaft connecting the other arms of said bell cranks, said shaft being turnable therein, a draw bar rigidly attached to the shaft, an arm rigidly attached to the shaft at approximately right angles to the draw bar, a connection extending from the free end of said arm to the housing of the tractor adapted to limit the rocking motion of the shaft, and to hold said draw bar on an approximately horizontal plane when being lifted by the lift arms, means for pivotally attaching the offset disk harrow to the free end of said draw bar.

2. In a device described in claim 1, said draw bar being connected with the offset disk harrow as follows: an angling bar universally pivoted at one end to the front section of the offset harrow, a hinge constructed of two plates pivotally attached with their faces adjacent to each other, one of said plates being attached to the draw bar and the other plate attached to the angling bar, said hinge being adapted to permit a horizontal motion but not a vertical motion, an arm extending from the rear section, said front and rear sections being hingedly connected, and a link pivotally attached at one end to the free end of the angling bar, and pivotally attached at the other end to said arm attached to the rear section.

3. A hitch adapted to connect a tractor with an offset disk harrow, consisting of lift arms pivotally attached to the housing of the tractor, means for raising and lowering the lift arms at will, bell cranks pivotally attached near the angle thereof to the free ends of the lift arms, an arm of each bell crank extending approximately adjacent to the lift arms, and the other arms of said bell cranks extending upwardly from the lift arms, a bar rigidly connecting the upwardly extending arms of said bell cranks, a shaft connecting the arms of the bell cranks running approximately adjacent to the lift arms, said shaft being adapted to have a slight rocking movement, a draw bar rigidly attached to said shaft, an upright post rigidly attached to the shaft, a link pivotally attached to the upright post at one end and to the housing at the other end, said described elements being adapted to keep the draw bar on parallel planes as it is raised by raising the lift arms, a pivotal connection between the draw bar and the harrow, said pivotal connection consisting of a turn table constructed of two plates pivotally connected with their faces adjacent to each other, one of said plates being attached to the free end of the draw bar, and the other plate being attached to an angle bar universally pivoted to the front section of the harrow, the front and rear sections of said harrow being hingedly connected.

4. In a device described in claim 3, an adjustable stop attached to the bar connecting the bell cranks, said stop being positioned to engage the draw bar as the lift bars descend, said adjustable stop being adapted to regulate the depth of the cut of the blades on said harrow.

5. A hitch connecting a tractor to an offset disk harrow consisting of lift arms pivotally attached at one end to the housing of the tractor, the free ends of said arms extending rearwardly from the tractor, means for raising and lowering said arms at will, a bell crank attached to each of said arms near the free end thereof, a rocking shaft connecting the bell cranks, said rocking shaft being adapted to be raised or lowered by the movement of the bell cranks, a draw bar rigidly attached to the rocking shaft, means for attaching the draw bar to the harrow, an auxiliary connecting bar adapted to hold the bell cranks in rigid relation, an auxiliary bell crank pivotally attached to the auxiliary connecting bar, a tie pivotally attached to the housing of the tractor at one end and to an arm of the auxiliary bell crank at the other end, the offset disk harrow consisting of two sections hingedly connected, and adapted to be moved to parallel relation, and to angular relation with each other, a cable attached at one end to the rear section of the harrow, the other end of said cable being attached to an arm of the auxiliary bell crank, the length of the cable being such that when the lift arms are lowered the sections of the harrow are adapted to angle with relation to each other, and when the lift arms are raised the two sections of the harrow are drawn in parallel relation.

EINAR COOK.